(12) United States Patent
Rusch et al.

(10) Patent No.: US 10,826,149 B2
(45) Date of Patent: Nov. 3, 2020

(54) DIELECTRIC WAVEGUIDE INCLUDING A CORE FOR CONFINING A MILLIMETER-WAVE SIGNAL WITH A LOW-LOSS TANGENT

(71) Applicant: TE Connectivity Germany GmbH, Bensheim (DE)

(72) Inventors: Christian Rusch, Waldsee (DE); Markus Dittmann, Zwingenberg (DE); Carlos Almeida, Reinheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 16/130,232

(22) Filed: Sep. 13, 2018

(65) Prior Publication Data

US 2019/0013562 A1    Jan. 10, 2019

Related U.S. Application Data

(63) Continuation of application No. PCT/EP2017/056178, filed on Mar. 15, 2017.

(30) Foreign Application Priority Data

Mar. 16, 2016   (EP) .................................. 16160596

(51) Int. Cl.
  *H01P 3/16*   (2006.01)
  *G02B 6/44*   (2006.01)
(52) U.S. Cl.
  CPC .............. *H01P 3/16* (2013.01); *G02B 6/4415* (2013.01)
(58) Field of Classification Search
  CPC ........................................................ H01P 3/16
  (Continued)

(56) References Cited

U.S. PATENT DOCUMENTS

| | | | |
|---|---|---|---|
| 4,215,313 | A | 7/1980 | Chang et al. |
| 4,463,329 | A | 7/1984 | Suzuki |

(Continued)

FOREIGN PATENT DOCUMENTS

| | | |
|---|---|---|
| EP | 2363913 A1 | 9/2011 |
| JP | S58-215804 A | 12/1983 |
| JP | 2008-28523 A | 2/2008 |

OTHER PUBLICATIONS

Japanese Notice of Reasons for Refusal with English translation, Japanese Patent Application No. 2018-548188, dated Jul. 30, 2019, 15 pages.

(Continued)

*Primary Examiner* — Benny T Lee
(74) *Attorney, Agent, or Firm* — Barley Snyder

(57) ABSTRACT

A dielectric waveguide and/or a cable for transmission of millimeter-wave signals. The dielectric waveguide and/or the cable comprises an inner core having a dielectric medium adapted to transmit a millimeter-wave signal by carrying an electromagnetic field along the dielectric waveguide and/or the cable. The dielectric medium is a dielectric material having dielectric properties adapted to confine the propagating electromagnetic field to the inner core, while adding low transmission loss at signal frequencies in a millimeter-wave frequency range. The dielectric medium may be provided as a core of solid dielectric material, one or more bundles of fibers that extend along the length of the inner core, or as powder and/or granulate of dielectric material that fills the volume of the inner core. The dielectric material may be quartz or alumina.

19 Claims, 3 Drawing Sheets

(58) Field of Classification Search
USPC .......................................................... 333/239
See application file for complete search history.

(56) References Cited

U.S. PATENT DOCUMENTS

| | | | |
|---|---|---|---|
| 4,463,330 | A | 7/1984 | Yoneyama |
| 4,603,942 | A | 8/1986 | Chang et al. |
| 4,665,660 | A | 5/1987 | Jablonski et al. |
| 4,800,350 | A | 1/1989 | Bridges et al. |
| 2008/0025680 | A1* | 1/2008 | Sun et al. .......... G02B 6/02033 385/125 |
| 2014/0285294 | A1 | 9/2014 | Haroun et al. |
| 2014/0368301 | A1 | 12/2014 | Herbsommer et al. |
| 2016/0064795 | A1* | 3/2016 | Chang et al. .......... G02B 6/032 343/893 |
| 2018/0040936 | A1* | 2/2018 | Yoshimoto et al. ....... C08J 5/00 |

OTHER PUBLICATIONS

Abstract of JP 2008-28523 A, dated Feb. 7, 2008, 1 page.
PCT Notification, The International Search Report and The Written Opinion of the International Searching Authority, dated May 18, 2017, 17 pages.
Yeh C., et al., "Dielectric Ribbon Waveguide An Optimum Configuration for Ultra-Law-Loss Millimeter/Submillimeter Dielectric Waveguide", IEEE Transactions on Microwave Theory and Techniques, IEEE Service Center, Piscataway, NJ, US, vol. 38, No. 6, Jun. 1, 1990, pp. 691-702.
Jia X., et al., "A knitted textile waveguide", 2014 Loughborough Antennas and Propagation Conference (LAPC), IEEE, Nov. 10, 2014, pp. 679-682.
Korean Office Action with English translation, Korean Patent Application No. 10-2018-7029598, dated Nov. 28, 2019, 7 pages.
European Search Report, App. No. EP 19213174, dated Apr. 9, 2020, 11 pages.
William M. Bruno, et al., "Flexible Dielectric Waveguides with Powder Cores", IEEE Transactions on Microwave and Techniques, vol. 36, No. 5, dated May 1, 1988, 9 pages.
Skyworks, "Basic Dielectric Materials", dated Jan. 26, 2016, 2 pages.
Lamb J W, "Miscellaneous Data on Materials for Millimetre and Submillimetre Optics", International Journal of Infrared and Millimeter Waves, Springer, Dordrecht, NL, vol. 17, No. 12, dated Dec. 1, 1996, 38 pages.
The First Chinese Office Action and English translation, dated May 22, 2020, 19 pages.

* cited by examiner

DIELECTRIC WAVEGUIDE INCLUDING A CORE FOR CONFINING A MILLIMETER-WAVE SIGNAL WITH A LOW-LOSS TANGENT

CROSS-REFERENCE TO RELATED APPLICATIONS

This application is a continuation of PCT International Application No. PCT/EP2017/056178 filed Mar. 15, 2017, which claims priority under 35 U.S.C. § 119 to EP 16160596.9 filed Mar. 16, 2016.

FIELD OF THE INVENTION

The present invention relates to dielectric waveguides for millimeter-wave communication links and, more particularly, to dielectric waveguides having dielectric properties that add low transmission loss to communication links operating at millimeter-wave frequencies.

BACKGROUND

Communication links based on optical fibers have been increasingly employed as an alternative to full electrical-wire links for high-speed data transmission, for instance at transmission signal wavelengths in the range from 200 nm to 2000 nm. In view of the constant need for increased (data rate) bandwidth, electrical-wire link length is limited by transmission losses, whereas optical links are feasible and widely used for long link lengths. On the other hand, conventional optical link solutions become less interesting with decreasing link length due to the costs associated with non-silicon semiconductor technology, fiber alignment and surface precision.

Dielectric waveguides/fibers have proven to be useful for transmitting millimeter-wave signals with low losses and are promising candidates for new communication systems which use carrier frequencies around 85 GHz and 140 GHz. However, since the transmitting power of integrated circuits operating within the high frequency range is limited and the respective receivers require a minimum signal input power level, waveguides with very low attenuation levels are required in order to obtain sufficient link length. In dielectric waveguides consisting of a pure dielectric material and containing no metal parts, the electromagnetic field distribution of the traveling wave subdivides into a part that propagates within the dielectric core and a part that propagates within the medium surrounding the fiber, which is usually air. However, due to the dielectric loss tangent of most available dielectric materials, such dielectric waveguides add too high transmission losses to the communication link.

Research studies appear to show that conventional dielectric waveguides having very low transmission losses guide the propagating field mainly in the surrounding air. For this reason, in order to obtain lower losses along the length of the fiber, conventional dielectric fibers are usually configured such as to ensure that a significant part of the electromagnetic field propagates in the medium surrounding the fiber. However, such conventional configurations have the drawback that integrity of the transmitted signal becomes degraded, or may even be interrupted, due to the interaction between the electromagnetic field propagating in the medium surrounding the fiber and external agents, such as a finger or hand that touches the dielectric waveguide. For instance, it has been shown that a 12.7 Gbps link at 120 GHz over 1 meter can be realized with dielectric waveguides based on conventional polymer materials. However, the signal transmission along the fiber can be interrupted if a user touches the fiber.

Patent Application Publication No. US 2014/0368301 A1 describes the addition of a metallic shield around the core and cladding layers of dielectric fibers as a means for reducing electromagnetic interference between the transmitted signal and external objects. However, dielectric waveguides including metallic shields, such as cooper or aluminum shields, are rather costly. Moreover, the manufacturing process of waveguides integrating polymers and metallic materials is more elaborate and time consuming than of waveguides exclusively made of polymer materials. In addition, since available dielectric waveguides are configured so that most of the propagating electromagnetic field travels within the medium (air/foam) surrounding the dielectric core, such waveguides present a rather large cross-section that may pose limitations to their use in applications requiring a compact design.

Hence, there is still a need for dielectric waveguide solutions for transmission of millimeter-wave signals that add low transmission loss to the communication links and are capable of preserving signal integrity along the dielectric waveguide and which can be produced in a simple and cost-effective manner, while having a smaller diameter than the existing prior art.

SUMMARY OF THE INVENTION

In accordance with the present invention, a dielectric waveguide for transmission of millimeter-wave signals comprises a core having a dielectric medium that transmits a millimeter-wave signal by carrying an electromagnetic field along the dielectric waveguide. The dielectric medium of the core has dielectric properties that confine the transmitted electromagnetic field to the core, while adding low transmission loss at signal frequencies in a millimeter-wave frequency range.

The present invention also provides a cable for transmitting signals at millimeter-wave frequencies comprising the dielectric waveguide of the present invention.

The accompanying drawings illustrate several embodiments of the present invention. These drawings, together with the description, serve to explain the principles of the invention. The drawings are for the purpose of illustrating various examples of how the present invention can be made and used and are not to be construed as limiting the invention to only the illustrated and described embodiments. Furthermore, several aspects of the embodiments of the present invention may form, individually or in different combinations, solutions according to the present invention.

BRIEF DESCRIPTION OF THE DRAWINGS

Further features and advantages will become apparent from the following more particular description of the various embodiments of the invention, as illustrated in the accompanying drawings, in which like references refer to like elements, and wherein.

DETAILED DESCRIPTION OF THE EMBODIMENT(S)

Figure 1:
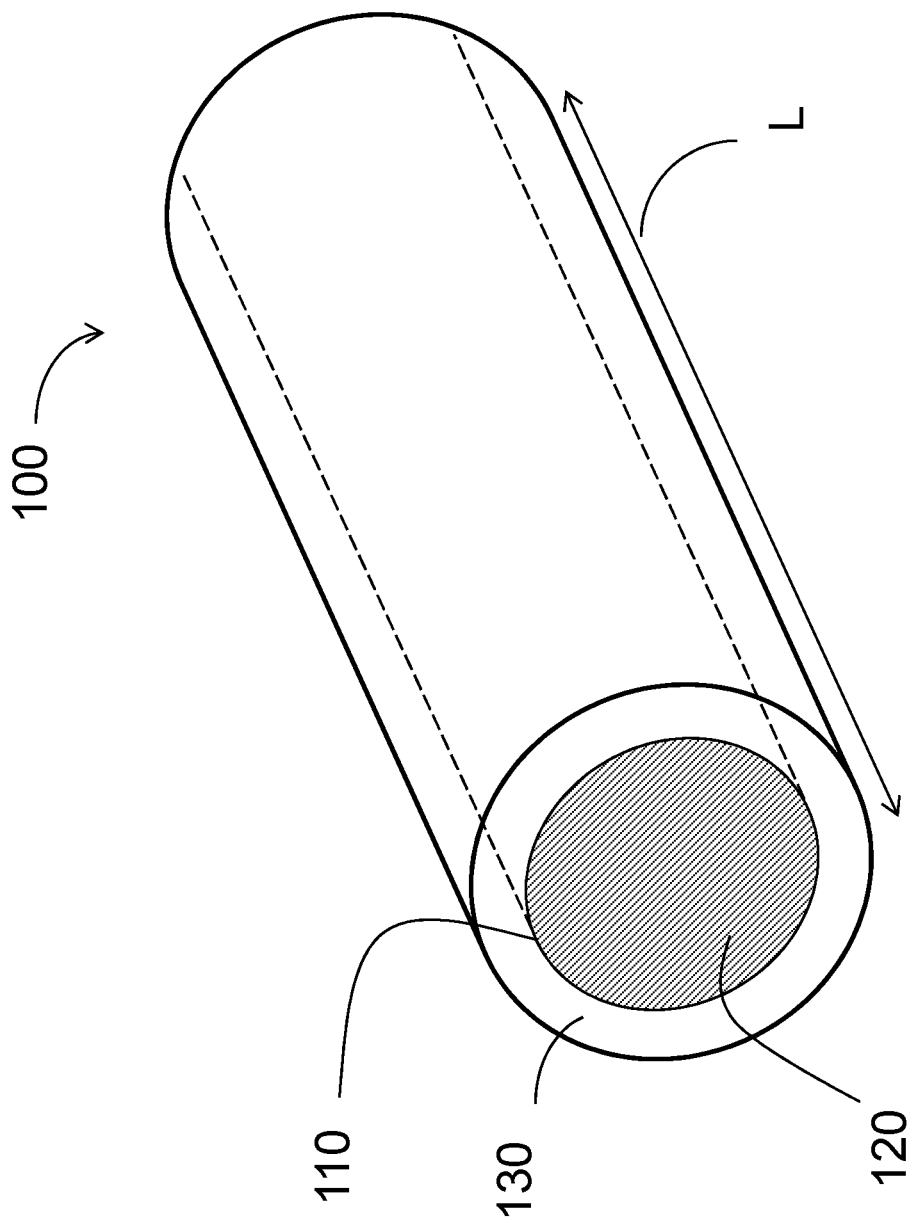
FIG. 1 is a perspective schematic view of a dielectric waveguide according to a first embodiment of the present invention.

The present invention will now be more fully described with reference to the figures, in which exemplary embodiments of the present invention are shown. The present invention may, however, be embodied in many different forms and should not be construed as limited to the embodiments set forth herein. Rather, these embodiments of the present invention are provided so that the disclosure will be thorough and complete and will fully convey the scope of the present invention to those skilled in the art.

A dielectric waveguide 100 for transmission of millimeter-wave signals will now be described with reference to FIG. 1. The dielectric waveguide 100 comprises an inner core 110 that extends along the dielectric waveguide length L and comprises a dielectric medium 120 for transmitting the millimeter-wave signal along the dielectric waveguide 100 by carrying an electromagnetic field associated with the millimeter-wave signal. The dielectric medium 120 comprises, or is made of, a dielectric material having dielectric properties that are selected so as to confine the propagating electromagnetic field to the inner core 110, while introducing low transmission loss at signal frequencies in the millimeter-wave frequency range, such as for instance, in the frequency range of 50 GHz to 300 GHz.

In order to achieve low transmission loss and low attenuation properties, the dielectric material of the dielectric medium 120 is selected so as to exhibit a dielectric constant higher than 3.0 and a loss tangent lower than 0.001 at signal frequencies in the millimeter-wave frequency range. The use of a dielectric material with a high dielectric constant value, such as 3.0, for the dielectric medium 120 leads to a significant portion of the electromagnetic field being confined within the dielectric medium 120, while only a reduced portion of the field propagates in the medium surrounding the inner core 110. As a result, the signal propagation along the dielectric waveguide 100 is relatively insensitive to touch or electromagnetic coupling with surrounding objects, while adding low transmission loss along the waveguide 100. For instance, the dielectric material chosen for the dielectric medium 120 may be quartz, which may exhibit a dielectric constant higher than 4.0 and a loss tangent lower than 0.0001 at millimeter-wave frequencies. Published values of the dielectric constant of quartz vary between 3.5 and 4.3 within the considered frequency range of 50 GHz to 300 GHz, depending on the material purity. Another example of a low loss, low attenuation dielectric material that can be used for the dielectric medium 120 of the inner core 110 is alumina. Alumina may exhibit a high dielectric constant of about 9.0 and a low loss tangent, tan<0.0007, depending on the degree of purity, at frequencies around 100 GHz.

Although the dielectric properties of the dielectric medium 120 may be sufficient for providing the desired low transmission loss and low sensitivity to the surrounding environment at millimeter-wave frequencies, the dielectric waveguide 100 may also comprise a cladding 130 disposed around the inner core 110 for further confining the propagating electromagnetic field to the inner core 110. As shown in FIG. 1, the cladding 130 may be directly adjacent to and surrounding the dielectric medium 120 so as to reinforce the effect of wave confinement provided by the high dielectric, low loss inner core 110. The cladding 130 may be a single layer of dielectric material, as illustrated in FIG. 1. However, the cladding 130 could also be a multilayered structure comprising a plurality of dielectric layers with respective dielectric constants that decrease outwards from the center of the dielectric waveguide 100. The cladding 130 is preferably made of a non-metallic material(s) so as to avoid the use of metals in the composition of the dielectric waveguide 100. In particular, the cladding 130 is preferably made of a dielectric material(s), such as polymer material, having a dielectric constant lower than the dielectric constant of the dielectric medium 120. The material(s) selected for the cladding 130 may also exhibit a low tangent loss with a value comparable to the tangent loss of the dielectric medium 120 so as to minimize the transmission loss introduced by the cladding 130 itself. However, since the portion of the electromagnetic field propagating outside the inner core 110 is already reduced due to the dielectric properties of the dielectric medium 120, the cladding 130 should not introduce significant transmission loss at millimeter-wave frequencies. For instance, very low attenuation (e.g., <2 dB/m) may be achieved for a configuration in which the dielectric waveguide 100 has an inner core 110 of quartz and a cladding layer 130 made of polytetrafluoroethylene (PTFE), which exhibits a dielectric constant and a loss tangent of about 2.1 and 0.00015, respectively, at 10 GHz. Another suitable material for the cladding layer 130 is a combination of PTFE and polyethylene (PE).

Simulation results of the signal attenuation for a dielectric waveguide 100 designed for a carrier frequency of 140 GHz, having an inner core 110 of quartz and a circular cladding layer 130 based on PTFE (having an outer diameter of 4 mm), and using air as the surrounding medium, show that less than 3% of the propagating electromagnetic field is carried in the surrounding medium (air) without using metallic shields. In contrast thereto, simulation results obtained for conventional dielectric waveguide fibers having a core made of low density polyethylene (LPDE) and a cladding of polypropylene (PP), which exhibit dielectric constants of about 2.4 and 2.15, respectively, show that a transmission loss of about 3.8 dB/m may be achieved at 140 GHz for an outer radius of the fiber of about 0.48 mm and a core with a rectangular cross-section of 0.4 mm×0.2 mm. However, in this case the low transmission loss per meter is due to the significant part of the field components propagating in the air surrounding the fiber, leading to the transmitted wave being highly sensitive to touch and/or strongly influence by coupling with surrounding components.

In the configuration of the dielectric waveguide 100 shown in FIG. 1, the dielectric medium 120 is a solid core of high dielectric constant and low-loss dielectric material, such as alumina or quartz. However, due to the stiffness of these materials in their solid form, the dielectric waveguide 100 is relatively stiff and difficult to bend.

Figure 2:
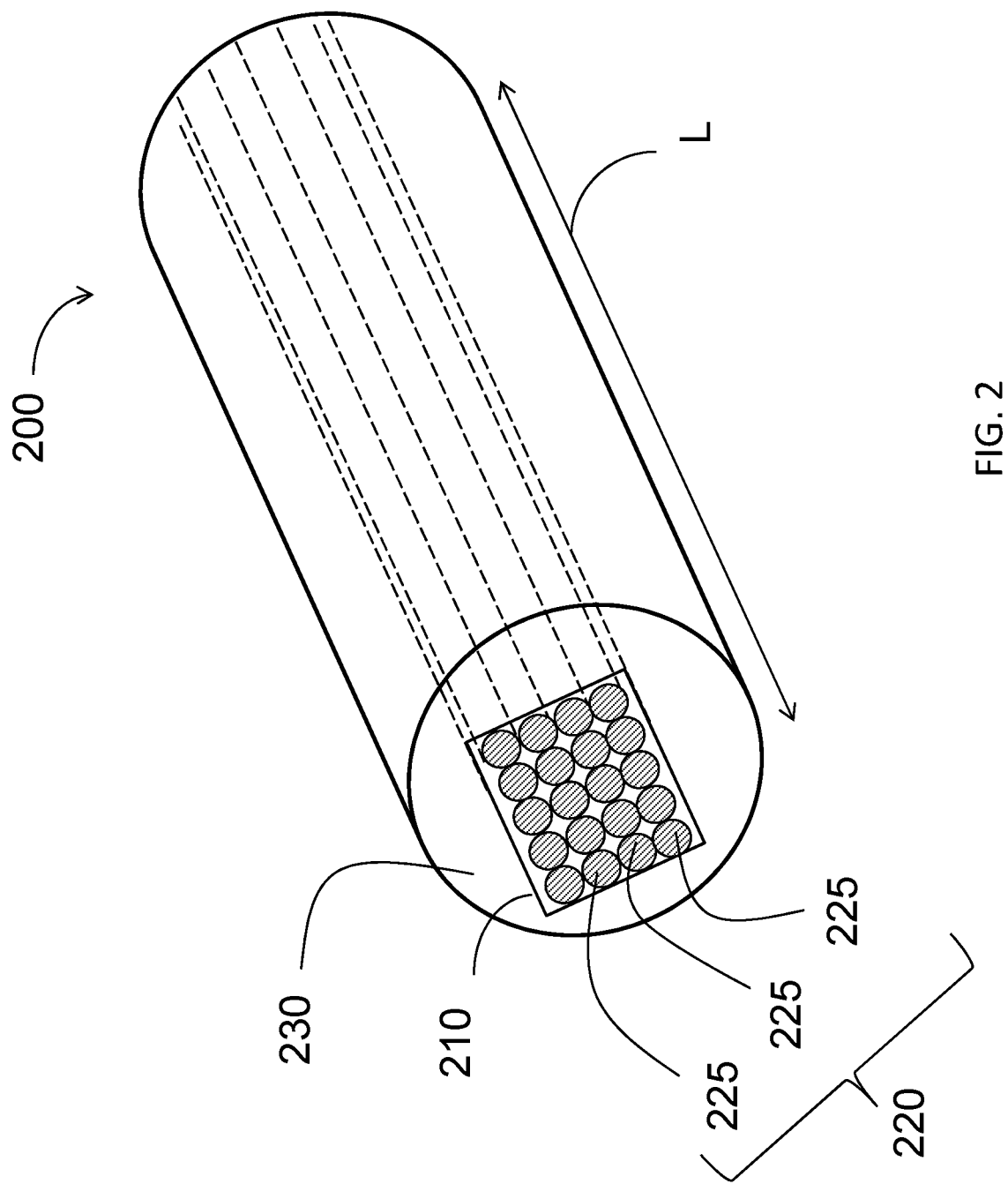
FIG. 2 is a perspective schematic view of a dielectric waveguide according to a second embodiment of the present invention.
Figure 3:
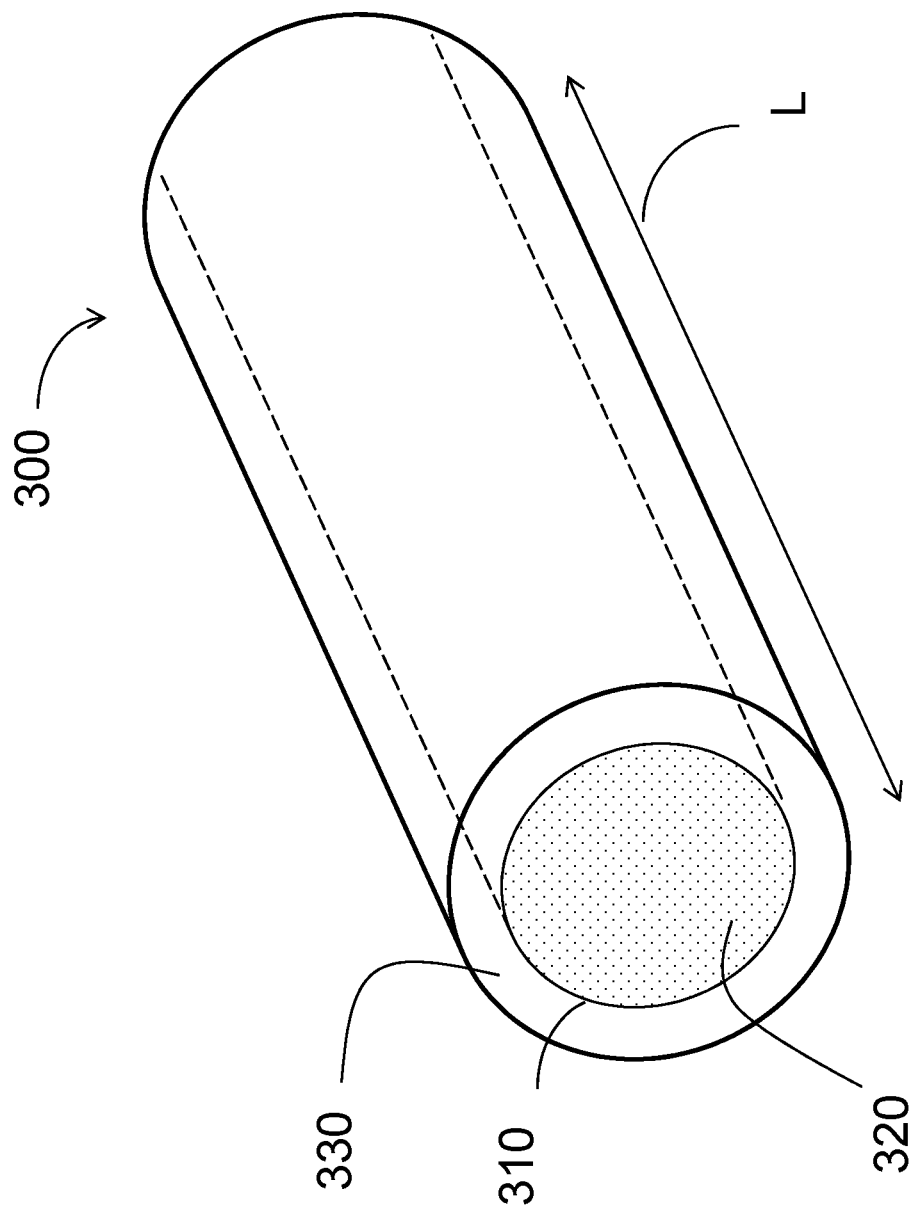
FIG. 3 is a perspective schematic view of a dielectric waveguide according to a third embodiment of the present invention.

FIGS. 2 and 3 illustrate alternative configurations for a low-loss dielectric waveguide constructed in accordance with the present invention and having improved flexibility in comparison to the dielectric waveguide 100 with the solid core 110 described above.

Referring to FIG. 2, the dielectric waveguide 200 comprises an inner core 210, in which the dielectric medium 220 for carrying the electromagnetic field associated with the transmitted signal comprises a plurality of fibers 225 made of a high dielectric constant, low-loss dielectric material. Each single fiber 225 may be made of the same dielectric material(s) used for the solid dielectric medium 120 of the inner core 110 described in FIG. 1 above, such as quartz or alumina, so as to provide dielectric properties similar to those of the solid core 110. However, due to the lower cross-section of each single fiber 225, their flexibility is increased as compared to a solid core of a larger diameter, thereby providing a flexible dielectric medium 220. The fibers 225 are preferably arranged in the form of a bundle and provided in sufficient number such as to provide a dielectric medium 220 with a cross-section of about a few millimeters, which is suitable for most millimeter-wave signal applications. Due to the relatively large wavelength of millimeter-wave signals, the use of a bundle of fibers as dielectric medium 220, instead of the solid core 110, does not significantly influence the propagation of the wave signal along the dielectric waveguide 200.

As illustrated in FIG. 2, each single fiber 225 of the bundle may continuously extend over the full length L of the dielectric waveguide 200. In addition, the single fibers 225 may be arranged so as to run substantially in parallel to each other so as to provide a compact arrangement and avoid breaking of the single fiber filaments.

Broken filaments in fiber bundles is a critical issue for optical waveguides used in optical links for the reason that they cause the light to couple out of the optical waveguide. At millimeter-wave frequencies, filament discontinuities along the length of the fiber bundle are not critical due to the larger wavelength of the transmitted signal. Accordingly, an alternative configuration of the low-loss dielectric waveguide 200 may be realized in which the dielectric medium of the inner core comprises one or more bundles of shorter fibers made of the same dielectric material with high dielectric constant and low tangent loss described above, but in which the shorter fibers do not have the full length L of the dielectric waveguide. In order to improve the dielectric properties of the bundle of shorter fibers, these may be spun so as to form a yarn or thread, like in textile yarns. This makes possible to bundle shorter filaments to a flexible yarn of the required diameter and provide a flexible dielectric medium for the inner core of the dielectric waveguide 200.

Although the inner core 210 of the dielectric waveguide 200 illustrated in FIG. 2 has a cross-section with a shape that is approximately rectangular, the fibers 225 or the short filaments forming the dielectric medium of the inner core may be arranged in a bundle having a cross-section of another shape, such as a square, circular or an elliptical shape.

In addition, similarly to the waveguide configuration described with reference to FIG. 1, the flexible core 210 may be further processed by applying a cladding 230 that surrounds the inner core 210. Preferably, the cladding 230 is arranged directly adjacent to the flexible core 210 and may be made of a non-metal material(s), similarly to the cladding 130 described above.

An alternative configuration for realizing a flexible low attenuation, low-loss dielectric waveguide 300 for transmission of millimeter-wave signals will now be described with reference to FIG. 3. In the illustrated configuration, the dielectric waveguide 300 comprises an inner core 310 in which the dielectric medium 320 for carrying the propagating wave is made of a powder and/or granulate of dielectric material of high dielectric constant and low loss tangent, (i.e., with r>3.0 and tan 0.001), that fills the volume of the inner core 310. For instance, the dielectric medium 320 may be a core of quartz powder or of alumina granulate. The effective dielectric constant and the loss tangent of the dielectric medium 320 may be lower than that of a solid core made of the same dielectric material due to a portion of the granular dielectric medium 320 being filled with another medium, such as air which exhibits a low dielectric constant, r=1.0 and a low loss tangent, tan=0.0. Nevertheless, by using powders of dielectric material(s) characterized by a high dielectric constant, such as alumina or quartz, an effective dielectric constant r higher than 3.0 and low transmission loss might still be achieved. For instance, in the case of an inner core of alumina, a reduction of the effective dielectric constant r from about 9.0 exhibited by a solid core to about 4.0 to 5.0 for the granulate core can be expected. Thus, it is possible to realize a dielectric waveguide having low-loss properties at millimeter-wave signal frequencies and having improved flexibility as compared to a dielectric waveguide with a core of the same solid dielectric material.

Similar to the previous embodiments, the dielectric waveguide 300 may also comprise a cladding layer 330 surrounding the inner core 310 so as to further reduce the interaction of the propagating field with external agents. As described above, the cladding 330 may be directly adjacent to the inner core 310 and is preferably made of a non-metallic material, (e.g., polymer materials including PTFE, PE or other polymers known in the field).

A jacket (not shown) may be provided around the inner core and the cladding of the dielectric waveguides described above.

Consequently, due to the relatively large wavelength of millimeter wave signals, the wave propagation will not be significantly influenced by the fact of the carrier medium of the inner core being implemented as a bundle of single fibers having the total waveguide length, a yarn of shorter fiber filaments and/or as a powder/granulate as compared to a solid core of the same high dielectric, low loss dielectric material. In addition, the enhanced flexibility of a core made of a powder material and/or of bundles of fibers with a lower diameter than a core of pure, solid material makes possible to significantly improve the bending properties of the dielectric waveguide without compromising the low loss characteristics associated with the high dielectric, low loss dielectric material discussed above.

In addition, one or more dielectric waveguides according to any of the configurations described above may be integrated in a single cable, thereby providing a low-loss cable for high speed communications.

What is claimed is:

1. A dielectric waveguide for transmission of millimeter-wave signals, comprising:
    a core having a dielectric medium adapted to transmit the millimeter-wave signals by carrying an electromagnetic field along the dielectric waveguide, the dielectric medium having a dielectric constant higher than 3.0 and a loss tangent lower than 0.001 at signal frequencies in a frequency range from 50 GHz to 300 GHz for confining the transmitted electromagnetic field within the core and providing low transmission loss.

2. A dielectric waveguide according to claim 1, wherein about less than 3% of the electromagnetic field is carried by a medium surrounding the dielectric waveguide at the signal frequencies in the frequency range.

3. A dielectric waveguide according to claim 2, wherein the surrounding medium is air.

4. A dielectric waveguide according to claim 1, further comprising a cladding surrounding the core for further confining the electromagnetic field within the core.

5. A dielectric waveguide according to claim 4, wherein the dielectric medium comprises one or more bundles of a plurality of fibers.

6. A dielectric waveguide according to claim 5, wherein each of the one or more bundles of the plurality of fibers extends along the core.

7. A dielectric waveguide according to claim 4, wherein the cladding is directly adjacent the core and is made of a non-metallic material.

8. A dielectric waveguide according to claim 4, wherein the dielectric medium is a solid.

9. A dielectric waveguide according to claim 4, wherein the dielectric medium comprises a powder and/or a granulate that fills the volume of the core.

10. A dielectric waveguide according to claim 4, wherein the cladding is a polymer material with a loss tangent lower than 0.001 at the signal frequencies in the frequency range.

11. A dielectric waveguide according to claim 1, wherein dielectric medium includes quartz or alumina.

12. A dielectric waveguide for transmission of millimeter-wave signals, comprising:
- a core having a dielectric medium adapted to transmit the millimeter-wave signals by carrying an electromagnetic field along the dielectric waveguide, the dielectric medium comprising a powder and/or a granulate that fills the volume of the core having a dielectric constant higher than 3.0 and a loss tangent lower than 0.001 at signal frequencies in a millimeter-wave frequency range for confining the transmitted electromagnetic field within the core and providing low transmission loss at the signal frequencies in the frequency range; and
- a cladding surrounding the core for further confining the electromagnetic field within the core.

13. A dielectric waveguide for transmission of millimeter-wave signals, comprising:
- a dielectric core adapted to transmit the millimeter-wave signals by carrying an electromagnetic field along the dielectric waveguide, the core comprising quartz with a dielectric constant higher than 3.0 and a loss tangent lower than 0.0001 or alumina, for confining the transmitted electromagnetic field within the core and providing low transmission loss at signal frequencies in a millimeter-wave frequency range; and
- a cladding surrounding the core for further confining the electromagnetic field within the core.

14. A dielectric waveguide according to claim 13, wherein the millimeter-wave frequency range includes signal frequencies in the range from 50 GHz to 300 GHz.

15. A dielectric waveguide for transmission of millimeter-wave signals, comprising:
- a core having a dielectric medium adapted to transmit the millimeter-wave signals by carrying an electromagnetic field along the dielectric waveguide, the dielectric medium comprising one or more bundles of a plurality of fibers having a dielectric constant higher than 3.0 and a loss tangent lower than 0.001 at signal frequencies in a millimeter-wave frequency range for confining the transmitted electromagnetic field within the core and providing low transmission loss at the signal frequencies in the frequency range; and
- a cladding surrounding the core for further confining the electromagnetic field within the core.

16. A dielectric waveguide according to claim 15, wherein each of the one or more bundles of the plurality of fibers extends along the core.

17. A dielectric waveguide according to claim 16, wherein each fiber extends along the core and has a length shorter than a full length of the core.

18. A dielectric waveguide for transmission of millimeter-wave signals comprising:
- a core having a dielectric medium adapted to transmit the millimeter-wave signals by carrying an electromagnetic field along the dielectric waveguide and to confine the transmitted electromagnetic field to the core, the dielectric medium comprising one or more bundles of a plurality of fibers, wherein each of the one or more bundles extends along the core and each fiber extends along the core and has a length shorter than a full length of the core; and
- a cladding surrounding the core for further confining the electromagnetic field to the core.

19. A dielectric waveguide according to claim 18, wherein the dielectric medium has a dielectric constant higher than 3.0 and a loss tangent lower than 0.001 at signal frequencies in a millimeter-wave frequency range.

* * * * *